(12) United States Patent
Yoshiyuki

(10) Patent No.: US 6,924,473 B2
(45) Date of Patent: Aug. 2, 2005

(54) WORK SUPPORT APPARATUS

(75) Inventor: Suzuki Yoshiyuki, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/868,355

(22) Filed: Jun. 16, 2004

(65) Prior Publication Data
US 2005/0006569 A1 Jan. 13, 2005

(30) Foreign Application Priority Data

Jun. 20, 2003 (JP) ......................................... 2003-177331

(51) Int. Cl.⁷ ............................. G06M 7/00; H01J 40/14
(52) U.S. Cl. ....................................... 250/221; 700/106
(58) Field of Search ............................... 250/21, 559.4, 250/559.29, 222.1; 340/555, 556, 557; 700/95, 97, 106, 107, 117; 901/46, 47

(56) References Cited

U.S. PATENT DOCUMENTS 6,748,295 B2 * 6/2004 Tilles et al. .................. 700/241

FOREIGN PATENT DOCUMENTS

JP 05-042461 2/1993
JP 10-301472 11/1998

* cited by examiner

Primary Examiner—Thanh X. Luu
Assistant Examiner—Seung C. Sohn
(74) Attorney, Agent, or Firm—Foley & Lardner LLP

(57) ABSTRACT

A parts shelf (2) has a configuration in which a storage box holding member for holding a plurality of parts storage boxes and a sensor holding member for holding photoelectric sensors are provided separately from each other. As the photoelectric sensor, an area sensor (100) capable of sensing coordinates of a position in which light is shielded in a predetermined two-dimensional area close to the front of the storage box holding member is employed. In an information processor (1), information of parts corresponding to a plurality of parts storage boxes of the storage box holding member and sizes and positions of the storage boxes is pre-stored. On the basis of the pre-stored information and the light-shielded position coordinates sensed by the area sensor, the storage box storing apart, the hand of the operator has reached is sensed.

8 Claims, 14 Drawing Sheets

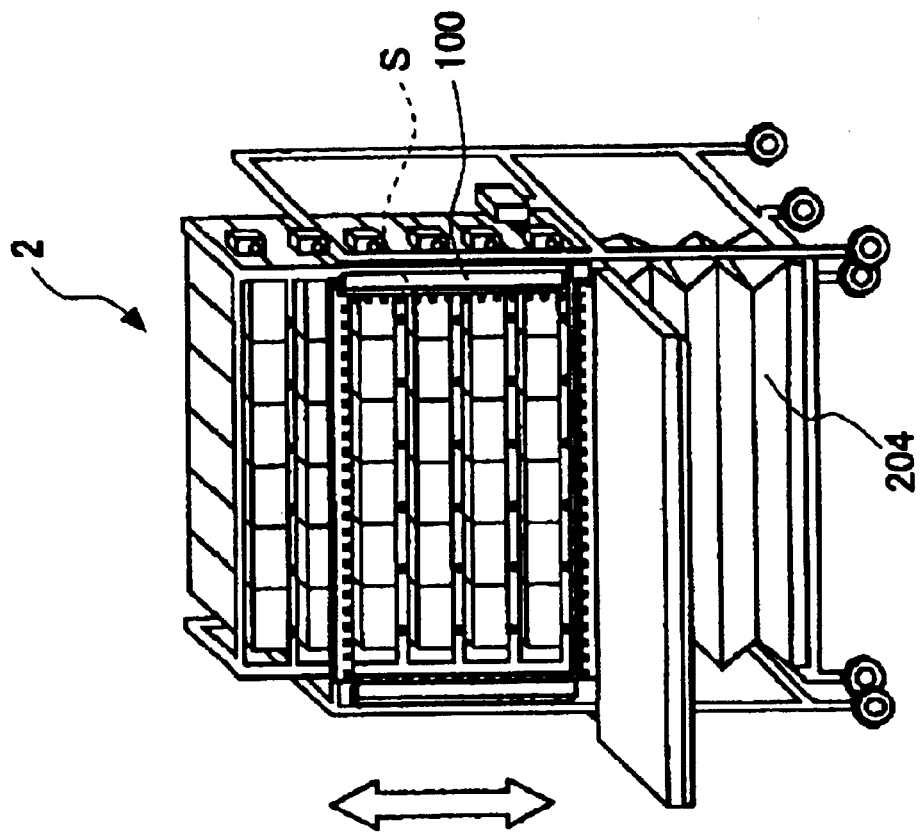
Fig. 4B Lifted state
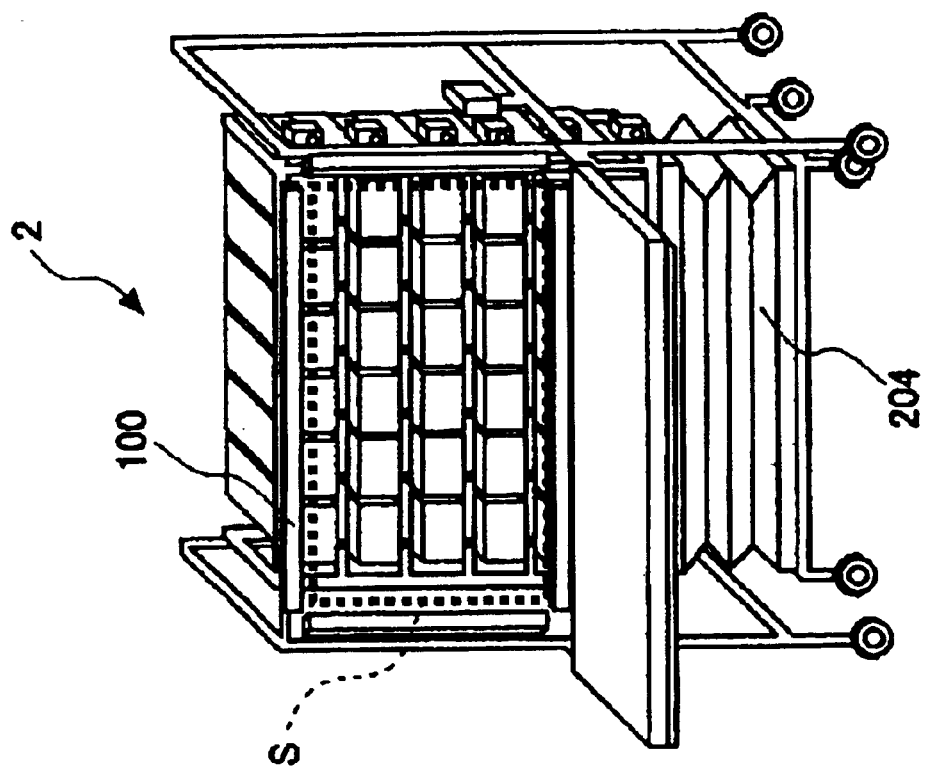
Fig. 4A Un-lifted state

Index numbers in horizontal direction

| | 1 | 2 | 3 | 4 | 5 | 6 | 7 | 8 | 9 | A | B | C | D | E | F |
|---|---|---|---|---|---|---|---|---|---|---|---|---|---|---|---|
| 0 | 1 | 2 | 3 | 4 | 5 | 6 | 7 | 8 | 9 | A | B | C | D | E | F |
| 1 | 11 | 12 | 13 | 14 | 15 | 16 | 17 | 18 | 19 | 1A | 1B | 1C | 1D | 1E | 1F |
| 2 | 21 | 22 | 23 | 24 | 25 | 26 | 27 | 28 | 29 | 2A | 2B | 2C | 2D | 2E | 2F |
| 3 | 31 | 32 | 33 | 34 | 35 | 36 | 37 | 38 | 39 | 3A | 3B | 3C | 3D | 3E | 3F |
| 4 | 41 | 42 | 43 | 44 | 45 | 46 | 47 | 48 | 49 | 4A | 4B | 4C | 4D | 4E | 4F |
| 5 | 51 | 52 | 53 | 54 | 55 | 56 | 57 | 58 | 59 | 5A | 5B | 5C | 5D | 5E | 5F |
| 6 | 61 | 62 | 63 | 64 | 65 | 66 | 67 | 68 | 69 | 6A | 6B | 6C | 6D | 6E | 6F |
| 7 | 71 | 72 | 73 | 74 | 75 | 76 | 77 | 78 | 79 | 7A | 7B | 7C | 7D | 7E | 7F |
| 8 | 81 | 82 | 83 | 84 | 85 | 86 | 87 | 88 | 89 | 8A | 8B | 8C | 8D | 8E | 8F |
| 9 | 91 | 92 | 93 | 94 | 95 | 96 | 97 | 98 | 99 | 9A | 9B | 9C | 9D | 9E | 9F |

Index numbers in vertical direction

WORK SUPPORT APPARATUS

BACKGROUND OF THE INVENTION

1. Field of the Invention

The present invention relates to a work support apparatus for properly teaching the operator an assembling procedure, parts to be used, and the like through a monitor or the like in a process of manufacturing a product. More particularly, the invention relates to a work support apparatus for verifying execution of pickup of a part from a parts shelf in which a plurality of parts storage boxes are housed by sensing a hand of the operator reaching a parts storage box by using a photoelectric sensor.

2. Description of the Prior Art

Generally, assembly, processing, inspection, and the like of products by the operator in an FA manufacture site are performed in a dedicated work space. In the work space, usually, a work table, a parts shelf in which a plurality of parts storage boxes are housed, and a jig shelf in which a plurality of jig storage boxes are housed are provided. Usually, a work instruction sheet in which parts and jigs necessary in work processes, modes of attaching parts, and the like are shown by sentences and drawings is distributed to each operator and the operator performs an operation in accordance with the work instruction sheet. However, it is not easy to form a work instruction sheet which is easily understood even by an operator who does not have enough experience. In a work performed by the operator while seeing the work instruction sheet, the level of skill and capability of each person are noticeably reflected in work speed, so that various problems occur such that work speed varies and a production line is delayed. Consequently, a work support apparatus (refer to, for example, Japanese Unexamined Patent Publication No. Hei 10-301472) and a work support apparatus (refer to, for example, Japanese Unexamined Patent Publication No. Hei 5-42461) have been proposed. The former work support apparatus properly teaches the operator an assembly procedure via a monitor or the like in accordance with inputs from various sensors for sensing a work (event) of an operator at a site, switches, timers, or the like. In the latter work support apparatus, a plurality of parts storage boxes are prepared. An indicator such as a lamp provided for a parts storage box storing parts necessary for each work is illuminated. A part picked up by the operator is detected by a photoelectric sensor provided for each parts storage box. If the operator picks up a part from parts storage boxes other than the parts storage box to be selected, a warning device operates.

By also combining the known techniques, a work support apparatus capable of properly teaching the operator an assembly procedure through a monitor, an indicator or the like, instructing pickup of a part from a parts storage box, and verifying the execution can be also realized.

The work support apparatus using the photoelectric sensor has, however, the following problems.

(1) A photoelectric sensor for sensing that a part is taken out from a parts storage box is disposed for each parts storage box. At the time of changeover, it is necessary to prepare parts storage boxes corresponding to different parts or replace parts in a parts storage box. In a site where production of small volumes of a wide variety of products is required, if a number of parts storage boxes according to the number of kinds are prepared, photoelectric sensors according to the number become necessary. It causes problems such that the cost increases and wiring requires much time and labor. When parts in the parts storage box are interchanged, problems occur such that the work efficiency deteriorates and, in addition, the risk that different kinds of parts mix increases.

(2) Further, in a site where production of small volumes of a wide variety of products is required, the sizes and kinds of the parts are various. Consequently, it is ideal to prepare parts storage boxes of various sizes. However, since the photoelectric sensor is disposed for each of the parts storage boxes, if photoelectric sensors of various sizes corresponding to the parts storage boxes of various sizes are prepared, the cost increases substantially. Due to this, hitherto, parts storage boxes of the same size are used irrespective of the sizes of parts. In other words, it is difficult to provide flexibility to layout of the parts storage boxes. It causes inconvenience in a changeover.

SUMMARY OF THE INVENTION

The invention has been achieved in consideration of the problems and its object is to provide a work support apparatus realizing much reduction in cost of photoelectric sensors and realizing changeovers suitable for production of small volumes of a wide variety of products by giving flexibility to the layout of parts storage boxes in a parts shelf.

The other objects and effects of the invention will be easily understood by persons skilled in the art from the following description of the specification.

A work support apparatus of the invention includes: a parts shelf in which a plurality of parts storage boxes with a parts ejection port facing forward are housed; and an information processor, properly notifies an operator of position of a parts storage box in which a necessary part is stored via a monitor, an Indicator disposed for each of the parts storage boxes, or the like and verifies execution of pickup of a part from the notified parts storage box by detecting a hand of the operator reaching a storage box by a photoelectric sensor.

In the work support apparatus of the invention, the parts shelf has a configuration in which a storage box holding member for holding a plurality of parts storage boxes and a sensor holding member for holding a photoelectric sensor are provided separately from each other.

As the photoelectric sensor, an area sensor capable of detecting the coordinates of a position in which light is shielded in a predetermined two-dimensional region close to the front side of the storage box holding member is employed.

In addition, in the information processor, information of parts corresponding to a plurality of parts storage boxes of the storage box holding member and sizes and positions of the storage boxes is pre-stored.

On the basis of the information and the coordinates of the light-shielded position sensed by the area sensor, a storage box including parts, to which a hand of the operator reached is sensed.

In the work support apparatus of the invention, since the area sensor is employed as the photoelectric sensor, it is unnecessary to prepare a number of sensors in accordance with the number of parts storage boxes and sizes, and the cost of the sensor can be largely reduced. In addition, it is unnecessary to mount photoelectric sensors for the parts storage boxes, so that parts shelves of various parts box layout configurations can be easily and cheaply constructed.

Further, by only pre-storing information of a storage box holding member to be assembled to the sensor holding member (information regarding the parts corresponding to a plurality of parts storage boxes and sizes and positions of the storage boxes) in the information processor, storage box holding members of various parts box layout configurations can be arbitrarily assembled to one sensor holding member. Thus, flexibility can be given to the layout of the parts storage boxes in the parts shelf.

Since the work support apparatus of the invention has a configuration as described above, for example, two or more kinds of storage box holding members in which two or more kinds of parts storage boxes of different sizes or shapes are housed in different layouts can be prepared. In such a manner, a changeover suitable for production of small volumes of a wide variety of products can be easily realized. Such a mode can be easily realized by pre-storing the information of a plurality of storage box holding members in the information processor.

In the invention, preferably, the area sensor is fixed in a predetermined position in the sensor holding member, and the storage box holding member is provided with a position varying mechanism for changing a portion in the storage box holding member, which faces an area to be sensed by the area sensor in a state where the storage box holding member is assembled to the sensor holding member.

As described above, by fixing the area sensor, the parts ejection region can be maintained in a predetermined position, so that the operator can maintain his/her standing position and the like within a predetermined range. On the other hand, storage boxes facing the area to be sensed by the area sensor can be properly changed by the position varying mechanism. Consequently, without being restricted by the size of the area to be sensed by the area sensor, a larger number of storage boxes (kinds of parts) can be held per storage box holding member.

The direction of moving the storage box holding member by using the "position varying mechanism" is arbitrary. For example, as the position varying mechanism, a lifter for changing the height of the storage box holding member can be employed. In such a mode, for example, as compared with the case of changing the position of the storage box holding member in the lateral direction relative to the area sensor, a larger number of parts can be disposed efficiently in a narrow work space for the reason that the work space generally has a sufficient space in the height direction.

More preferably, a plurality of RFID tags are provided in a line for the storage box holding member, the sensor holding member has an RFID tag reader, and the information processor determines whether changing of the position of the storage box holding member is properly made or not on the basis of ID tag information read by the ID tag reader.

The "RFID" denotes a radio frequency identification system which can read information stored in a tag in a non-contact manner. Concretely, RFIDs of V600 series manufactured by Omron Corporation can be mentioned.

In such a mode, whether the position change is properly made or not can be automatically checked.

In the invention, preferably, the information processor notifies the operator of a timing of changing the position of the storage box holding member via a monitor, an indicator or the like in a work process. In such a manner, in the case where it is necessary to move the storage box holding member during a work, the operator can properly know the timing of changing the position of the storage box holding member.

More preferably, the storage box holding member has a plurality of indicators disposed in correspondence with the storage boxes to selectively instruct a parts box to the operator, and the information processor notifies the operator of a portion in the storage box holding member to face an area to be sensed by the area sensor by simultaneously turning on predetermined indicators on the timing of changing the position of the storage box holding member.

The "position changing timing" is preliminarily stored in the information processor in consideration of the work process. With respect to "simultaneous turn-on of predetermined indicators", arbitrary ones can be selectively turned on. In short, it is sufficient to teach the operator a portion in the storage box holding member to face the area to be sensed by the area sensor. As an example, by adjusting lighted LEDs so as to lie within the inner frame of the area sensor body, the planned portion in the storage box holding member may face the area to be sensed by the area sensor.

With such a configuration, the position change mode of the storage box holding member relative to the area sensor can be notified to the operator. Thus, a positioning error can be prevented. Means for notifying the position change mode may not be provided.

BRIEF DESCRIPTION OF THE DRAWINGS

FIGS. 4A and 4B show diagrams illustrating a work using a lifter.

FIGS. 7A and 7B show diagrams (No. 2) illustrating a method of teaching an information processor a layout of parts storage boxes in a storage box holding member.

DESCRIPTION OF THE PREFERRED EMBODIMENTS

A preferred embodiment of a work support apparatus according to the invention will be described in detail hereinbelow with reference to the attached drawings. The following embodiment is just an example of the invention and, needless to say, the gist of the invention is specified only by the scope of claims.

Figure 1:
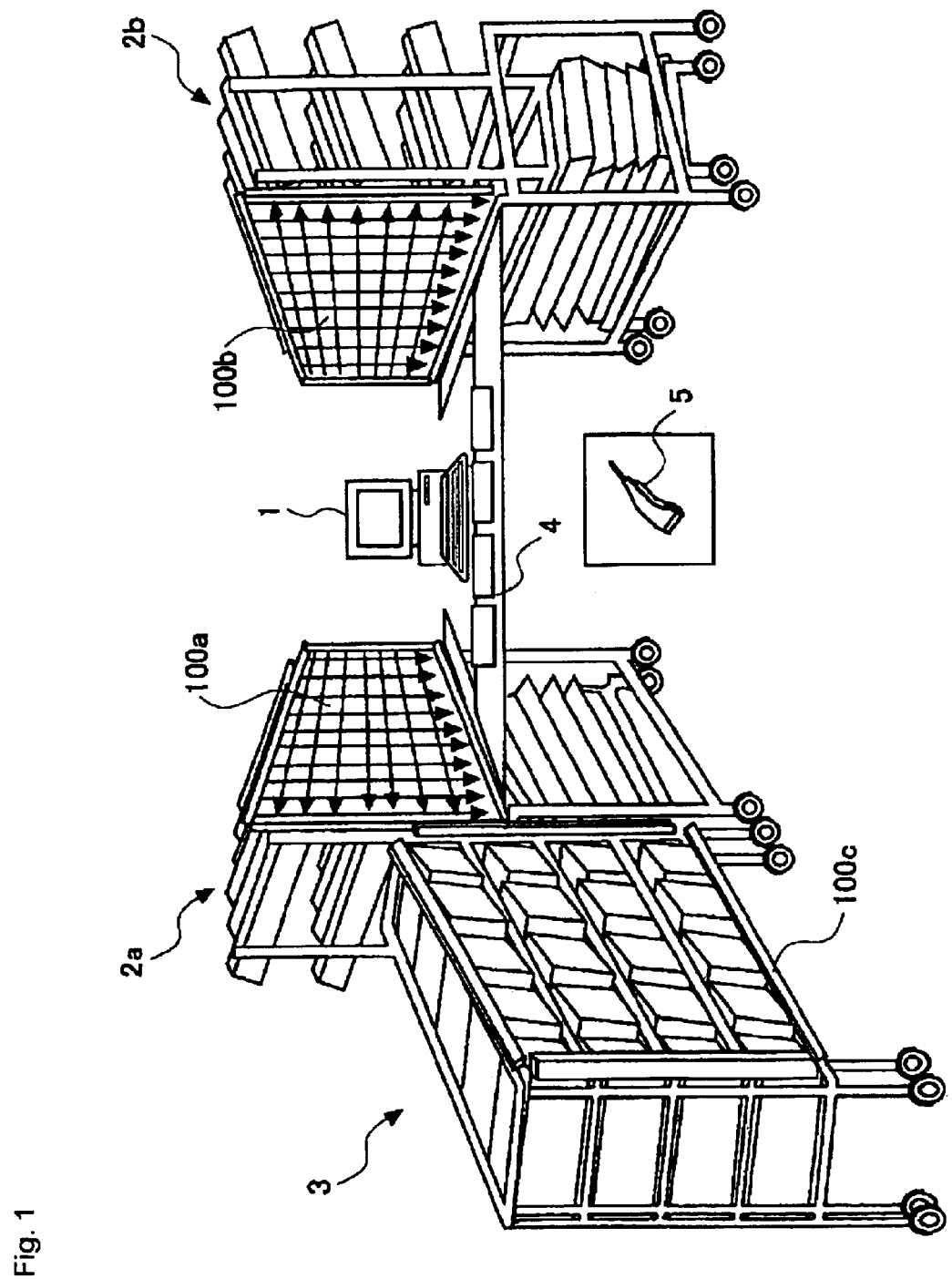
FIG. 1 shows a sketch generally showing a work support apparatus according to the invention.

FIG. 1 is a sketch generally showing a work support apparatus according to the invention. As shown in FIG. 1, the work support apparatus of the embodiment includes a personal computer 1 as an information processor, a parts shelf 2 in which a plurality of parts storage boxes are housed, a jig shelf 3 in which a plurality of jig storage boxes are housed, a work table 4, and a bar code reader 5. In the example, the personal computer 1 is disposed in the center of the work table 4, and two parts shelves 2a and 2b are disposed so as to sandwich the work table 4. One jig shelf 3 is disposed on the side of the parts shelf 2a.

On the front faces of the parts shelves 2a and 2b and the jig shelf 3, area sensors 100a, 100b, and 100c are disposed, respectively. Each of the area sensors 100 is connected to the personal computer 1 and detects the coordinates of a light shielded position in a predetermined two-dimensional area on the front face of the shelf. The area sensor is constructed by two pairs each having a projector having a plurality of optical axes and a light receiver (so-called a light curtain). More concretely, in the example, as a projector/light receiver having an optical axis in the horizontal direction, an "area scanner Model No. F3ZN-S0510N15" (detection width of 510 mm and the number of optical axes of 35) of Omron Corporation is used. As a projector/light receiver having an optical axis in the vertical direction, an "area sensor Model No. F3ZN-S1470N15" (detection width of 1470 mm and the number of optical axes of 99) is used. Therefore, the two-dimensional area shown in the example is an area of 510 mm×1470 mm.

The bar code reader 5 is connected to the personal computer 1 and is used to read a work instruction sheet with a bar code prepared for each product to be manufactured. On the basis of the read bar code information, the personal computer 1 searches a database to specify a product to be manufactured, calls data of the procedure of manufacturing the product and, in accordance with the manufacturing procedure data, teaches the manufacturing procedure to the operator via a monitor or an LED which will be described later.

Figure 2:
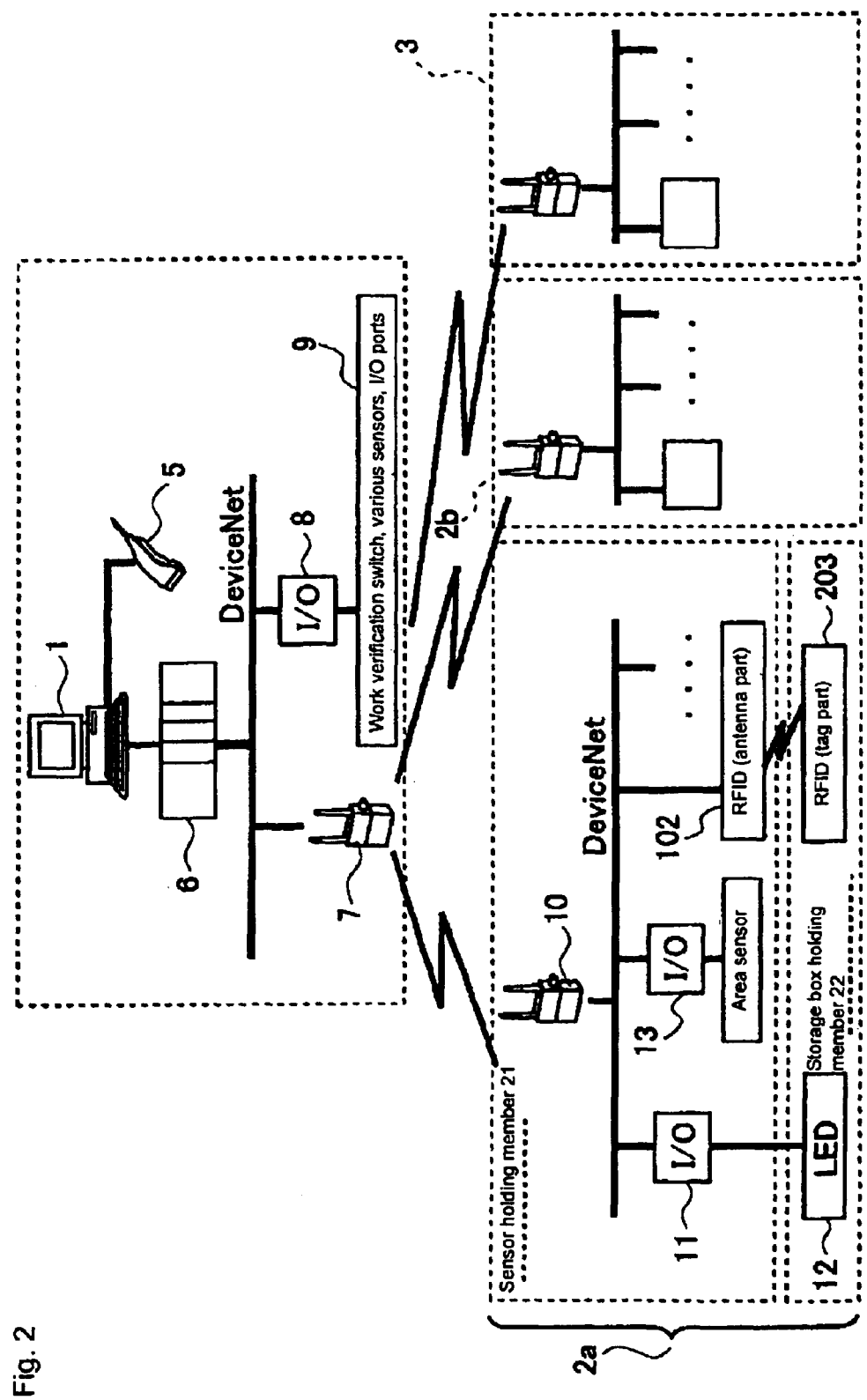
FIG. 2 shows a block diagram of the work support apparatus according to the invention.

FIG. 2 is a block diagram of the work support apparatus of the embodiment. Not shown in FIG. 1, to the personal computer 1, a PLC 6 as a low-order device is connected. Transmission and reception of signals between various devices to be described later and the personal computer 1 are executed via the PLC 6.

To the PLC 6, a radio unit 7 and an I/O 8 are connected via a device net. The radio unit 7 is provided to give flexibility to a communication line and performs radio communication with a radio unit 10 provided for each of the parts shelves 2a and 2b and the jig shelf 3.

To the I/O 8, a work verification switch, various sensors, and an I/O port are connected. The work verification switch is used to notify the personal computer 1 of end of each event (process) and is properly depressed by the operator on completion of an event.

The configurations of the parts shelves 2a and 2b and the jig shelf 3 will now be described with reference to the drawings. Since the configurations of them are similar to each other, only the configuration of the parts shelf 2 will be described here.

The parts shelf 2 has a configuration in which a sensor holding member 21 to which the area sensor 100 is attached in a predetermined position and a storage box holding member 22 in which a plurality of parts storage boxes are housed are provided separately. In the example, two or more kinds of storage box holding members in which two or more kinds of parts storage boxes of different sizes or shapes are housed in different layouts are prepared and can be properly combined with the sensor holding member 21. Information of a timing and a storage box holding member to be combined with the sensor holding member 21 is pre-stored in the database in the personal computer 1 and is properly notified to the operator via the monitor.

On a side of the sensor holding member 21, the radio unit 10 for performing radio communication with the radio unit 7 described above, the area sensor 100 connected to the radio unit 10 via an I/O 13 on the device net, and an RFID antenna 102 connected to the radio unit 10 on the device net are provided. The RFID antenna 102 is attached to a predetermined position in the sensor holding member 21 (refer to FIG. 3), reads information recorded in an RFID tag in the storage box holding member 22 which will be described later, and notifies the personal computer 1 of the information.

Figure 3:
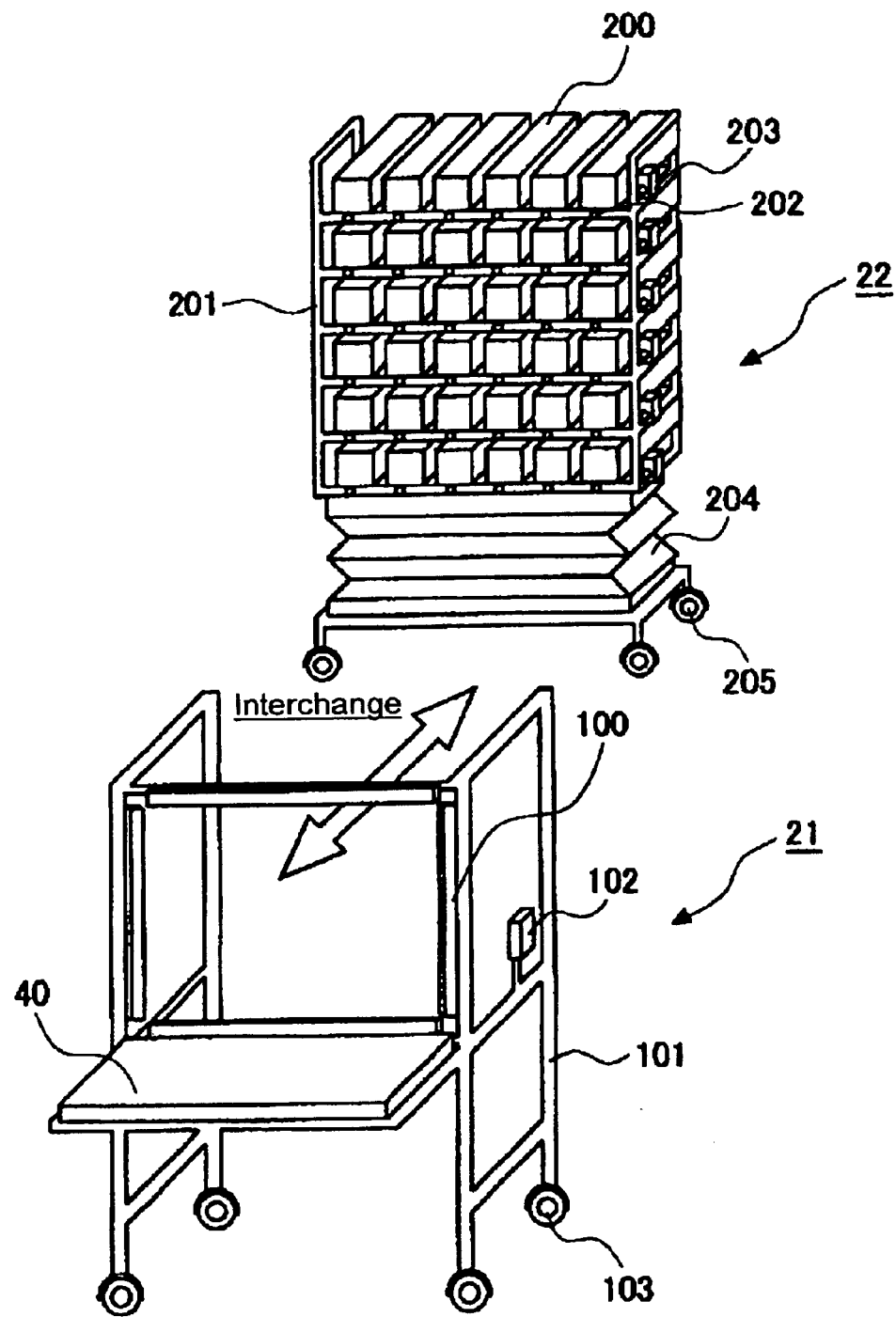
FIG. 3 shows a diagram showing the configuration of a parts shelf.

A plurality of parts storage boxes corresponding to various parts are housed in the storage box holding member 22, and LEDs 202 are provided for the parts storage boxes in a one-to-one correspondence manner (refer to FIGS. 3 and 5). Each of the LEDs is turned on/off by an instruction from the personal computer 1 and is provided to notify the operator of a parts storage box in which necessary parts are stored by light-on for each work. The LEDs 202 are connected to the I/O 11 provided on the side of the sensor holding member 21 in a state where the storage box holding member 22 is assembled to the sensor holding member 21.

In the storage box holding member 22, a plurality of RFID tags 203 are provided in line in the height direction (refer to FIG. 3). In each of the RFID tags, identification information of the storage box holding member 22 to which the RFID tag is attached (information for discrimination from the other storage box holding members) and peculiar position information of the storage box holding member is recorded. By reading the information recorded in the closest RFID tag 203 via the RFID antenna 102 of the storage box holding member 22, the information processor 1 determines whether or not a proper storage box holding member is assembled to the sensor holding member 21 and also determines whether a height change state of the storage box holding member 22 for the sensor holding member 21 is proper or not (as will be described later with reference to FIG. 4, the storage box holding member 22 is expansible in the vertical direction by a lifter 204 in a state where it is assembled with the sensor holding member 21).

FIG. 3 shows the details of the configuration of the parts shelf. As shown in FIG. 3, the parts shelf is constructed by assembling a proper storage box holding member 22 to the sensor holding member 21.

The sensor holding member 21 is formed by using pipes 101 of Yazaki Industrial Chemical Co., Ltd. as a skeleton. A spare work table 40, an area sensor 100, an RFID antenna 102, and casters 103 for movement are attached as shown in FIG. 3.

On the other hand, the storage box holding member 22 is similarly formed by using the pipes 101 of Yazaki Industrial Chemical Co., Ltd. as a skeleton, and holds a plurality of (36 in the example shown in the diagram) parts storage boxes 200 in which various parts are stored. The LED 202 is buried in the pipe 101 just below the front side (parts ejection port side) of each storage box (in the example shown in the diagram, the total number of the LEDs 202 is 36 which is the same number as that of the storage boxes). In the right-side face of the storage box holding member 22, a plurality of (six in the example shown in the diagram) of the above-described RFID tags 203 are disposed in line in the height direction.

The storage box holding member 22 also has casters 205 for movement and is characterized in that a lifter (low lifter made by Trusco Nakayama Corporation, Model No. HDL-W1058J) 204 is provided between a group of parts storage boxes 200 and the casters. In this example, the lifter 204 extends in the vertical direction by a not-shown operation switch, thereby enabling the height of the storage box holding member 22 to be adjusted.

The action by the lifter will be described with reference to FIGS. 4A and 4B. FIG. 4A shows a state of the parts shelf 2 when the storage box holding member 22 illustrated in FIG. 3 is not lifted, and FIG. 4B shows a state of the parts shelf 2 when the storage box holding member 22 illustrated in FIG. 3 is lifted. Reference character S denotes an area (predetermined two-dimensional area) to be sensed by the area sensor 100.

As obviously from FIGS. 4A and 4B, the height of the storage box holding member 22 is adjusted by operating the lifter 204, thereby changing parts storage boxes facing the area S to be sensed. In a state of FIG. 4A, total 24 parts storage boxes in four rows from the top face the area S to be sensed. In the state of FIG. 4B, total 24 parts storage boxes in four rows from the bottom face the area S to be sensed.

As described above, in the embodiment, by enabling the height of the storage box holding member 22 to be changed by the lifter 204, while maintaining a parts ejection area specified by the attachment position of the area sensor 100 at a predetermined position, the parts storage boxes facing the parts ejection area (from which parts can be picked up) can be properly changed. Consequently, without being restricted by the size of the area S to be sensed by the area sensor 100, parts storage boxes (kinds of parts) of larger number can be held by the storage box holding member 22.

Information of the execution timing of height change of the storage box holding member 22 and the degree of change in the work process is pre-stored in the database of the personal computer 1 and the execution timing is properly notified to the operator via the monitor. The degree of height change is notified by teaching the operator of a group of storage boxes to face the area S to be sensed by the area sensor 100 by simultaneously turning on predetermined LEDs in the storage box holding member 22. More concretely, it is preset so that, by adjusting the lighted LEDs to be within the inner frame of the area sensor 100, planned parts storage boxes face the area S to be sensed by the area sensor. Whether such height change is normally made or not is confirmed by reading the closest RFID tag 203 by the RFID antenna 102 each time. In the personal computer 1, information of an RFID tag (peculiar position information) to be read at each timing of executing height change is pre-stored in the database. When the height change is not performed normally, predetermined notification to urge re-execution of height adjustment is provided via the monitor.

Although the state where the storage box holding member 22 in which a plurality of parts storage boxes of the same size are housed is assembled to the sensor holding member 21 is shown in the embodiments of FIGS. 3 and 4, as described above, in this example, two or more kinds of storage box holding members in which two or more kinds of parts storage boxes of different sizes or shapes are housed in different layouts are prepared and can be properly assembled to the sense holding member 21.

Figure 5B:
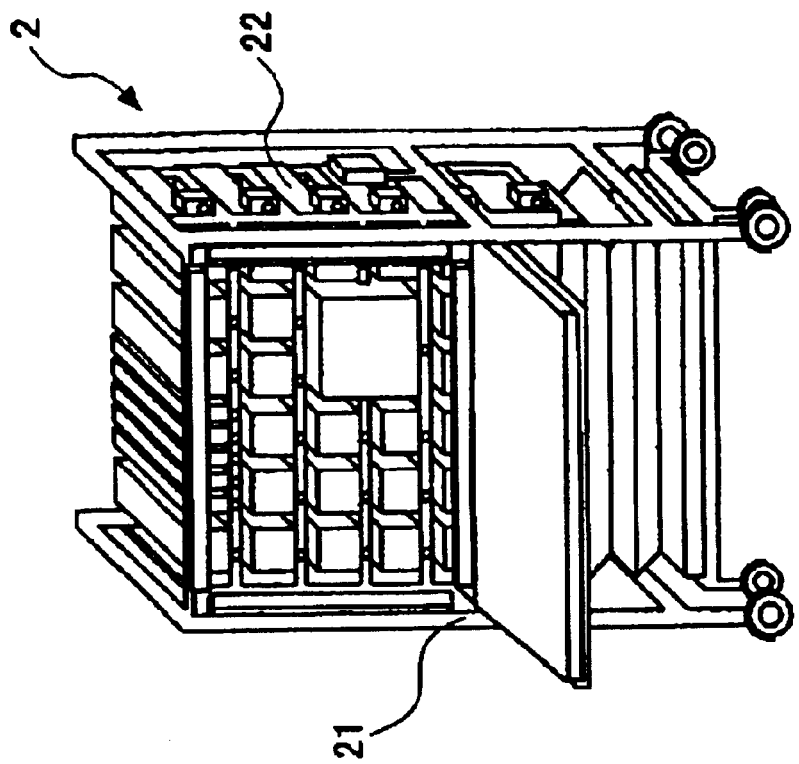
FIGS. 5A and 5B show diagrams showing an example of a parts shelf obtained by combining a storage box holding member of another mode.
Figure 5A:
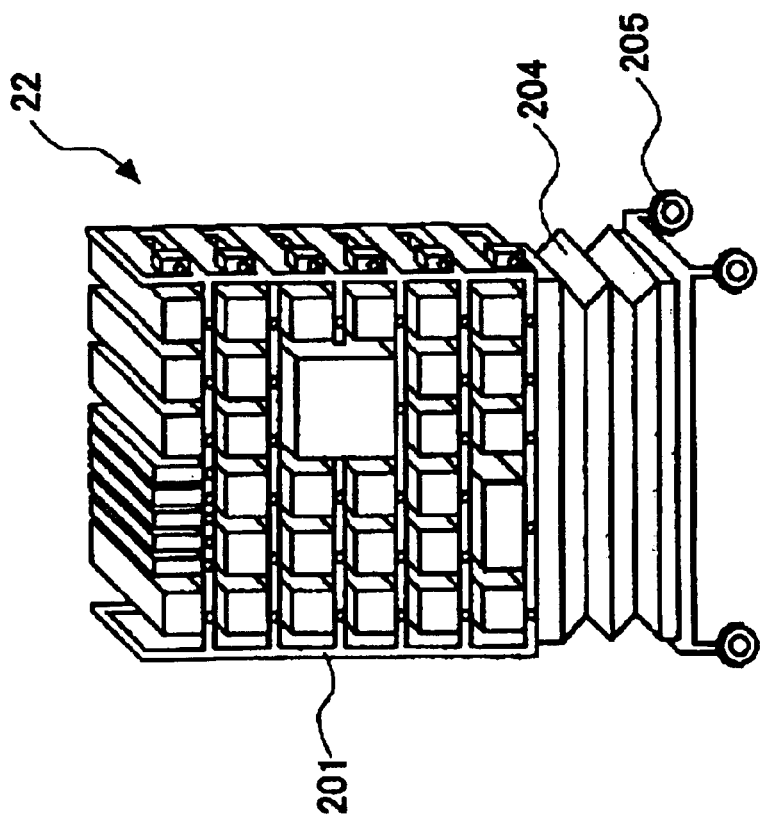

FIGS. 5A and 5B show an example of a parts shelf in which a storage box holding member of another mode is assembled. FIG. 5A shows an example of the storage box holding member 22 of another mode and FIG. 5B shows an example of the parts shelf obtained by assembling the storage box holding member 22 of another mode to the sensor holding member 21.

As shown in FIGS. 5A and 5B, the storage box holding member 22 in which two or more kinds of parts storage boxes of different sizes or shapes are mixedly housed can be assembled to the sensor holding member 21. Also in the storage box holding member 22 in such a mode, the LEDs 22 are provided for the parts storage boxes in a one-to-one corresponding manner. On the right side face of the storage box holding member 22, a plurality of (six in the example shown in the diagram) RFID tags 203 are arranged in line, and the height of the storage box holding member 22 can be changed via the lifter 204.

A method of notifying (storing) the layout of the parts storage boxes in the storage box holding member to the information processor (personal computer 1) will now be described with reference to FIGS. 6 and 7. As obvious from the description, it is necessary to pre-store the layout and sizes of parts storage boxes in each storage box holding member into the personal computer 1.

Figures 6A, 6B:
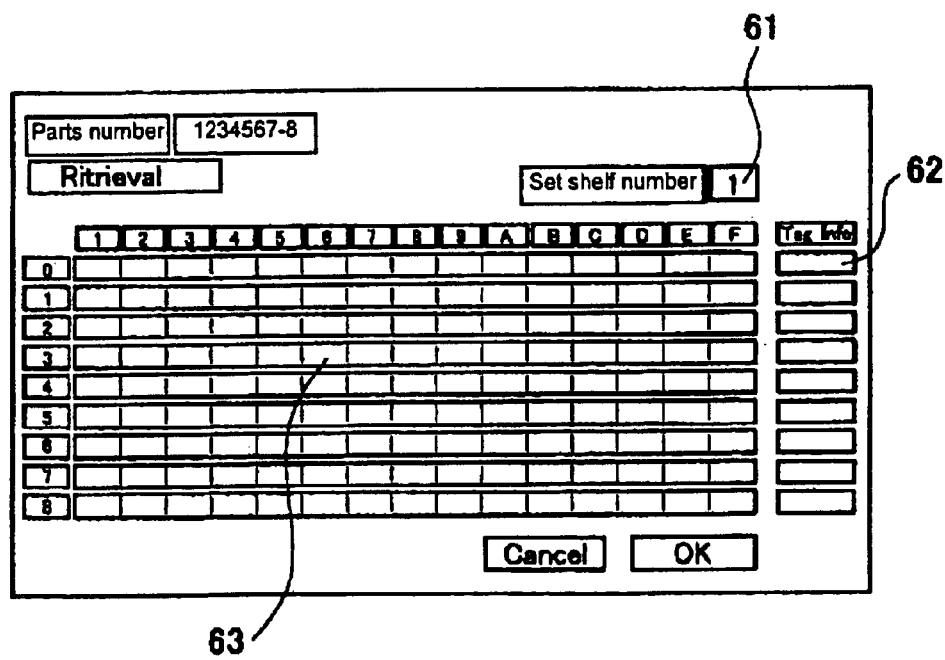
FIGS. 6A and 6B show diagrams (No. 1) illustrating a method of teaching an information processor a layout of parts storage boxes in a storage box holding member.

As shown in FIG. 6A, the information processor (personal computer) 1 recognizes the storage box holding member as an assembly of 150 minimum divided squares (obtained by dividing the storage box holding member into 10 pieces in the vertical direction (vertical index numbers "0" to "9") and dividing the storage box holding member into 15 pieces in the horizontal direction (lateral index numbers "1" to "F")) (numbers are designated to the squares). The position information of each of the parts storage boxes in the storage box holding member is stored as information associated with the minimum division square number. FIG. 6B shows an example of a parts storage box allocation window displayed on the monitor of the personal computer 1 for associating each square number with each parts storage box. In FIG. 6B, in a box indicated by reference numeral 61, identification number ("set shelf number") of a corresponding storage box holding member is shown. A box indicated by reference numeral 62 is an RFID tag information input box in which positioning information for height change of the storage box holding member is entered. The 150 minimum divided squares indicated by reference numeral 63 are expressed as buttons. By selecting a button by using an operator such as a mouse and entering the ID number of a corresponding parts storage box, the square number and the parts storage box are associated with each other.

Figures 7A, 7B:
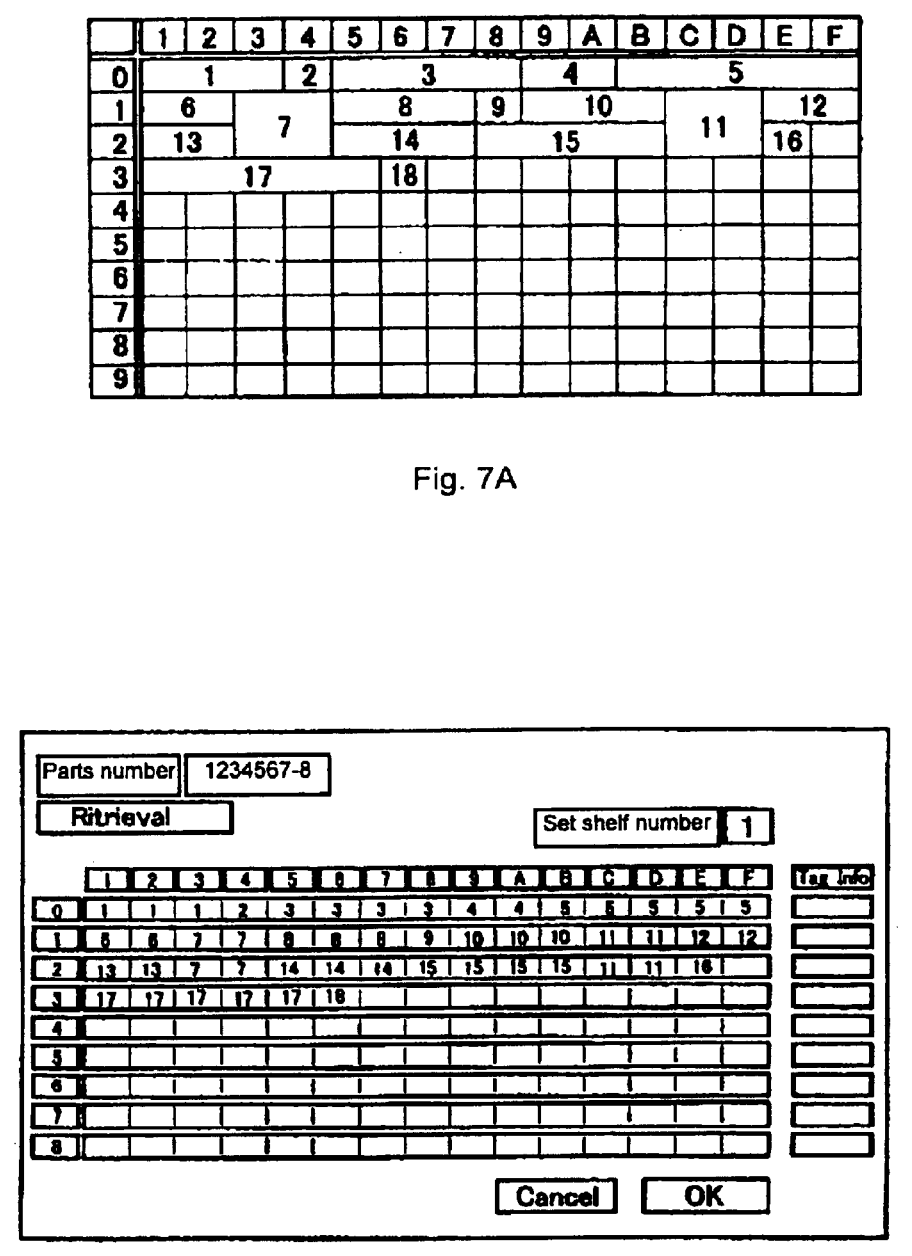

FIGS. 7A and 7B show a concrete example of association between a square number and a parts storage box. Assuming now that as shown in FIG. 7A, a storage box holding member in which 18 parts storage boxes of various sizes are housed is prepared. Association between a square number and a parts storage box in this case, that is, setting in a parts storage box allocation window (numbers allocated to the minimum division squares) is as shown in FIG. 7B. As described above, in the embodiment, by associating the square numbers with the parts storage boxes via the parts storage box allocation window shown in FIG. 6B or 7B, the layout of parts storage boxes in the storage box holding member is notified to the information processor (personal computer 1).

Figure 8:
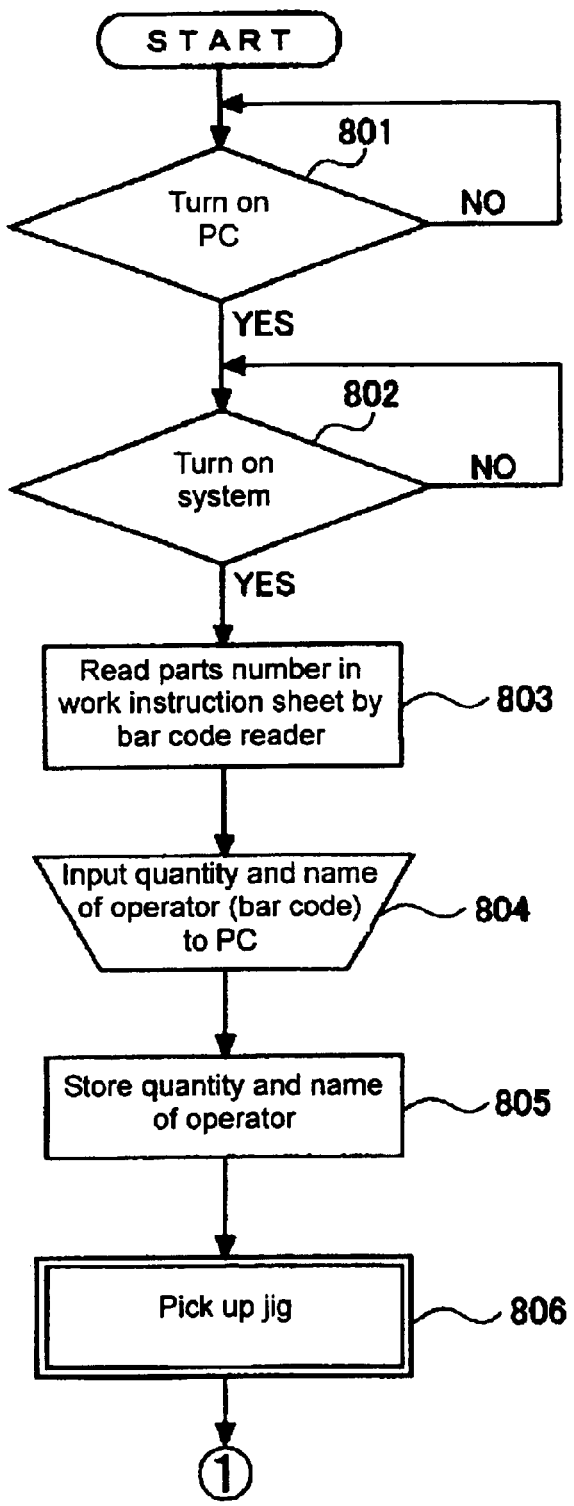
FIG. 8 shows a flowchart (No. 1) showing a work execution procedure using the work support apparatus according to the invention.

The procedure of executing a work by using the work support apparatus according to the invention will now be described with reference to the flowcharts of FIGS. 8 and 9.

At the start of a work, first, the operator turns on the power of the personal computer 1 (step 801) and turns on the power of a system (device other than the personal computer 1 such as the area sensor 100) (step 802). After turn-on of the power sources, a work instruction sheet with a bar code prepared for each product to be manufactured is read by the bar code reader 5 (step 803). On the basis of the read bar code information, the personal computer 1 searches a database, specifies a product to be manufactured, and calls data of a procedure of manufacturing the product.

After that, the operator inputs the number of products and the name of the operator via the bar code reader 5 into the personal computer 1 (step 804). The personal computer 1 receives and stores the number of products and the name of the operator (step 805).

Figure 10:
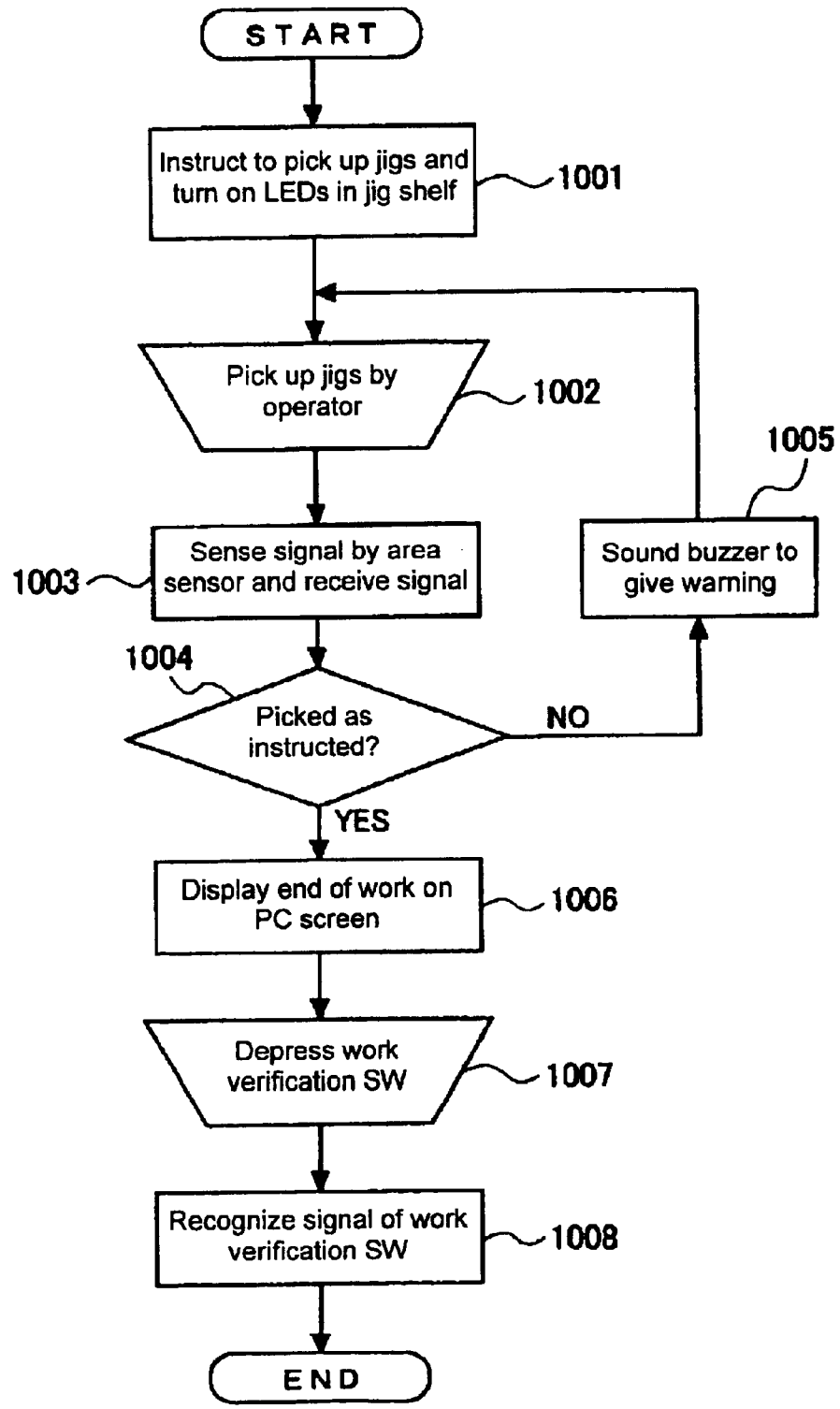
FIG. 10 shows a flowchart showing the details of a process of picking up a jig.

The program shifts to a jig picking process (step 806). The details of the jig picking process are shown by the flowchart of FIG. 10. In the jig picking process, first, the personal computer 1 instructs the operator to pick up a predetermined jig via the monitor. At this time, an LED corresponding to a jig storage box in which the predetermined jig is stored is turned on (step 1001). When the operator picks up a jig from the jig shelf depending on the LED (step 1002), the coordinates of a position in which light is shielded by a hand of the operator in the area to be sensed are sensed by the area sensor (step 1003). In the personal computer 1, information of jigs corresponding to the plurality of jig storage boxes of the storage box holding member and the size and position of each of the storage boxes is pre-stored in the database. By colliding the pre-stored information with the coordinates of the shielded position sensed in step 1003, whether the instructed jig has been picked up or not is determined (step 1004). When it is determined that a jig other than the instructed jig was picked up (NO in step 1004), a predetermined buzzer is sounded to give warning to the operator (step 1005).

When the instructed jig is picked up (YES in step 1004), the end of the work is displayed on the monitor to let the operator know about it (step 1006). When the operator depresses a work verification switch in response to the display (step 1007), the personal computer 1 recognizes a signal from the work verification switch (step 1008), and the jig picking process is once finished. Although not shown in the flowchart, the series of processes from step 1001 to step 1008 is repeated until all of necessary jigs are picked up.

Figure 9:
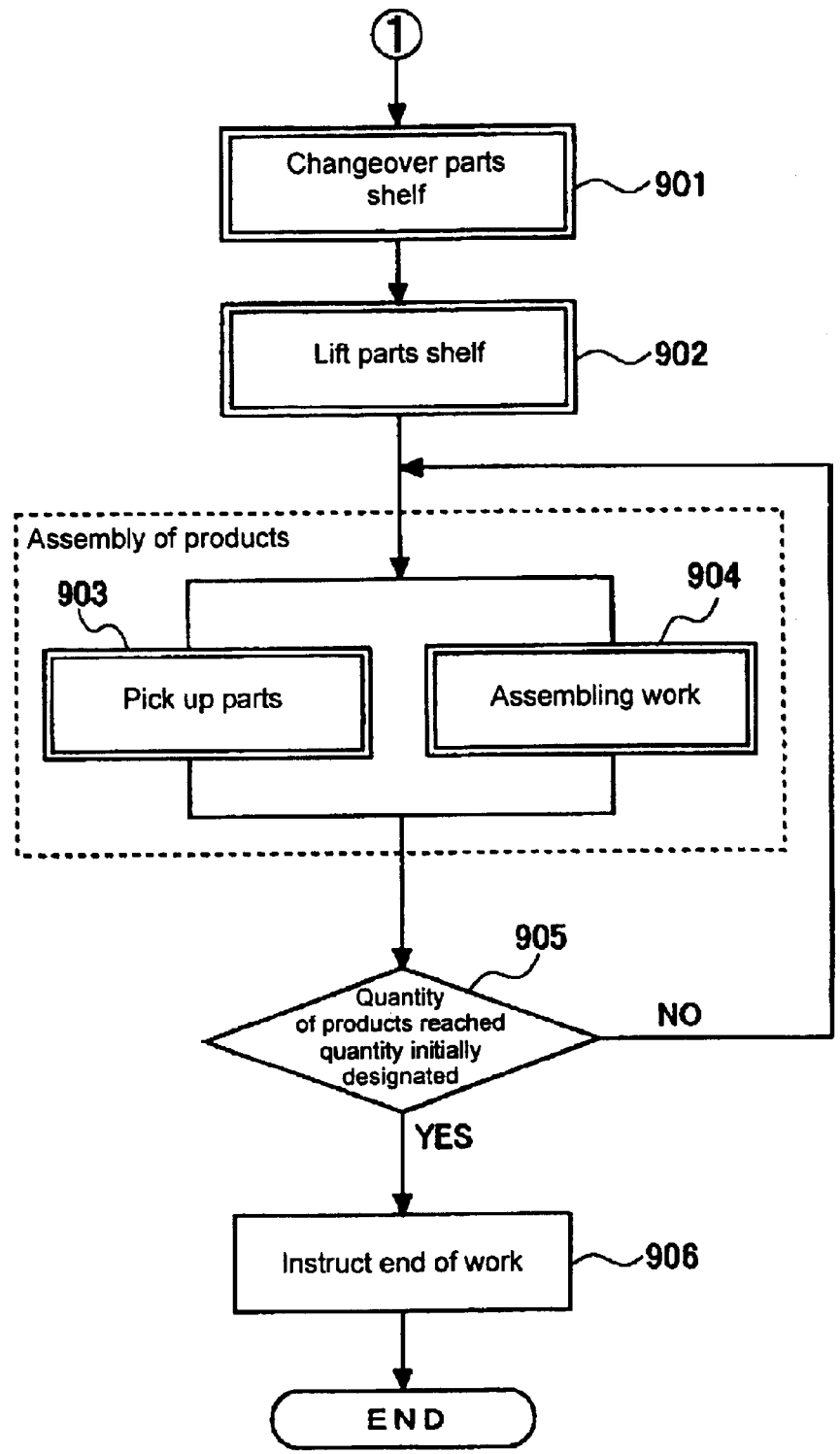
FIG. 9 shows a flowchart (No. 2) showing a work execution procedure using the work support apparatus according to the invention.
Figure 11:
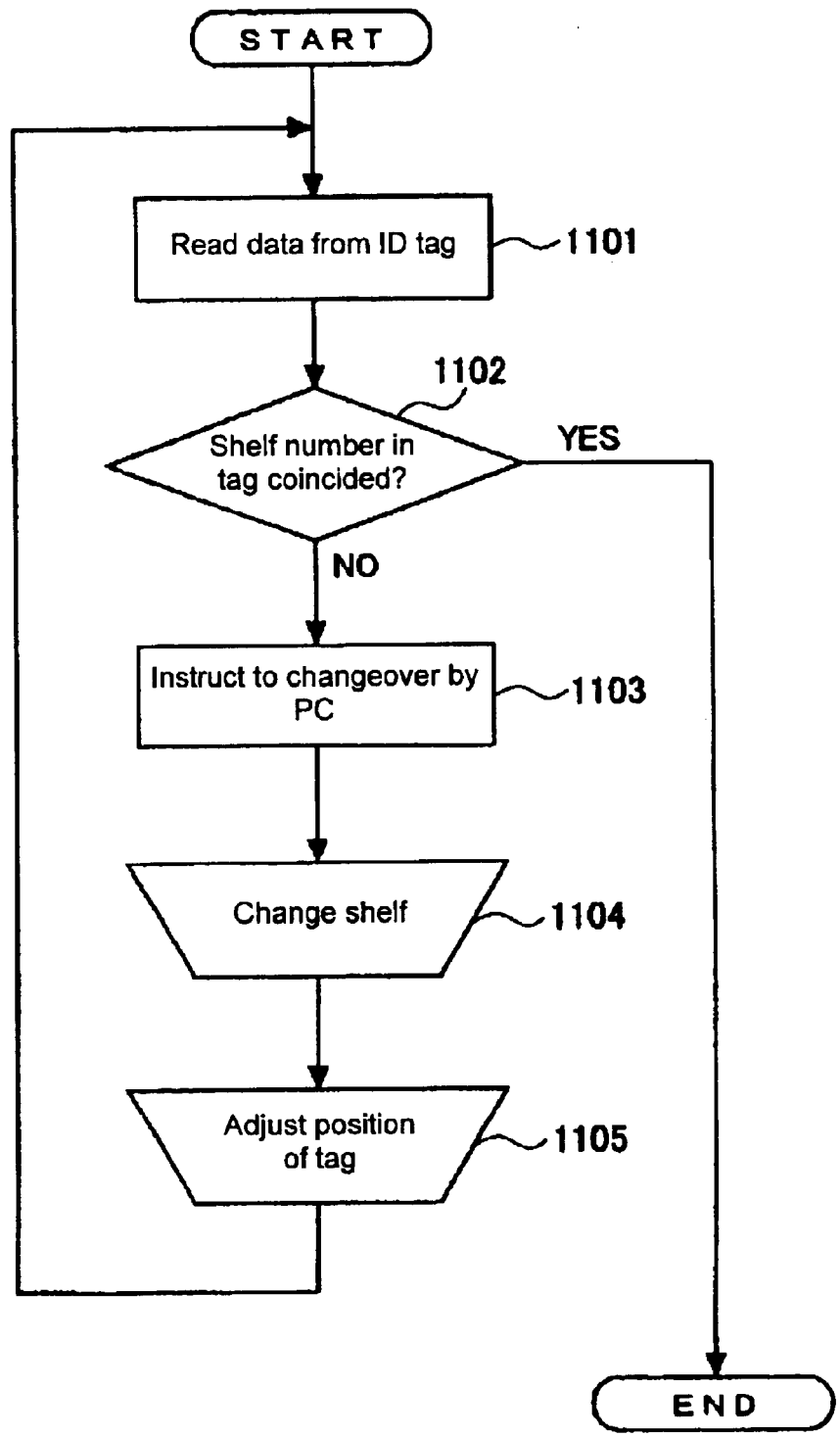
FIG. 11 shows a flowchart showing the details of a process of changeover of a parts shelf.

After completion of the jig picking process, as shown in the flowchart of FIG. 9, a process of changing a parts shelf is executed. The details of the process of changing the parts shelf are shown by the flowchart of FIG. 11. In the process of changing the parts shelf, first, in a state where the storage box holding member is assembled to the sensor holding member, information stored in the closest RFID tag (identification information of a storage box holding member to which the RFID tag is attached) is read via the RFID antenna (step 1101). The personal computer 1 determines whether a proper storage box holding member is assembled to the sensor holding member or not by checking whether the read ID information coincides with expected one or not (step 1102).

In the case where it is determined in step 1102 that a proper storage box holding member is assembled to the sensor holding member (YES in step 1102), the parts shelf changing process is once finished. On the other hand, when it is determined that a proper storage box holding member is not assembled to the sensor holding member (NO in step 1102), the personal computer 1 gives another changeover instruction (interchange of the storage box holding member) to the operator via the monitor (step 1103). In this case, the operator interchanges the storage box holding member (step 1104) and performs positioning of the RFID tag attached to the storage box holding member (an operation of making any RFID tag approach the RFID antenna) (step 1105). After the positioning is performed, the program shifts again to step 1101.

Figure 12:
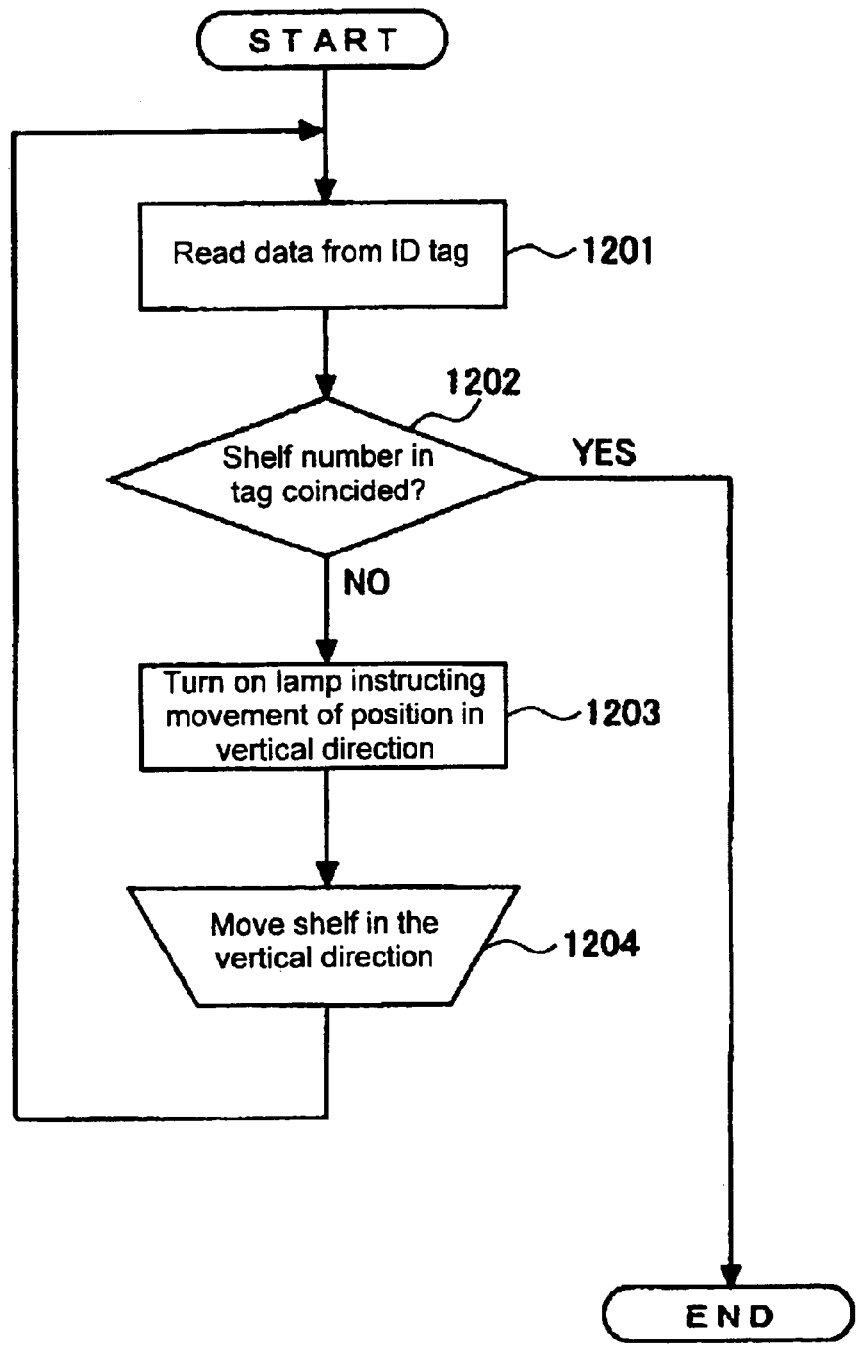
FIG. 12 shows a flowchart showing the details of a process of lifting the parts shelf.

Referring again to the flowchart of FIG. 9, after the process of changing the parts shelf is finished, a process of lifting the parts shelf is performed (step 902). The details of the process of lifting the parts shelf are shown by the flowchart of FIG. 12. In the process of lifting the parts shelf, first, in a state where the storage box holding member is assembled to the sensor box holding member, information recorded in the closest RFID tag (in this case, each position information in the storage box holding member) is read via the RFID antenna (step 1201). The personal computer 1 determines whether the height adjusted state of the storage box holding member is a planned one or not, that is, whether the planned parts storage boxes face the area to be sensed by the area sensor or not by checking whether the read position information coincides with the planned information or not (step 1202).

In the case where it is determined in step 1202 that the parts box holding member is in the planned height adjusted state (YES in step 1202), the process of lifting the parts shelf is once finished. On the other hand, when it is determined that the parts box holding member is not in the planned height adjustment state (NO in step 1202), the personal computer 1 simultaneously lights up predetermined LEDs in the storage box holding member (NO in step 1202), thereby notifying the operator of a storage box group to face the area S to be sensed by the area sensor (step 1203). The operator receives the notification and operates a not-shown operation switch to move a lifter so that the predetermined LEDs which illuminate at this time lie within the inner frame of the area sensor (step 1204). After the lifting operation, the program shifts again to step 1201.

Referring again to the flowchart of FIG. 9, after the parts shelf lifting process is finished, a product assembling process using the picked jigs and parts is performed. The product assembling process is performed by alternately or repeatedly executing the parts picking process (step 903) and the assembling process (step 904).

Figure 13:
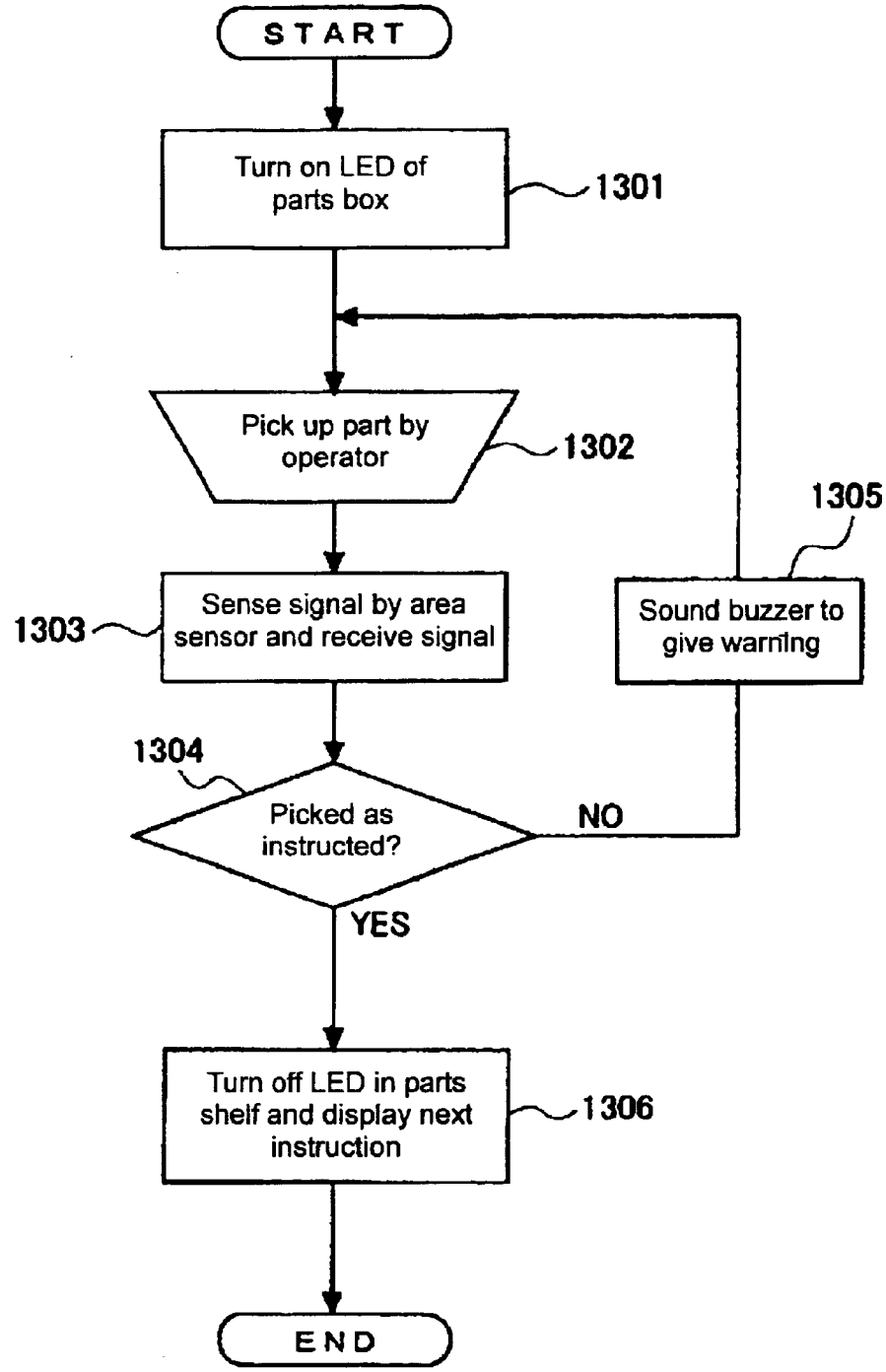
FIG. 13 shows a flowchart showing the details of a process of picking up parts.

The details of the parts picking process are shown by the flowchart of FIG. 13. In the parts picking process, first, the personal computer 1 turns on an LED corresponding to a parts storage box in which a part to be picked out is stored (step 1301). When the operator picks up the part from the parts shelf on the basis of the LED (step 1302), the coordinates of the position where light is shielded by a hand of the operator in the area to be sensed are detected by the area sensor (step 1303). In the personal computer 1, information of parts corresponding to the plurality of parts storage boxes of the storage box holding member and the size and position of each of the storage boxes is pre-stored in the database. By colliding the pre-stored information with the coordinates of the shielded position sensed in step 1303, whether the instructed part has been picked up or not is determined (step 1304). When it is determined that a part other than the instructed part was picked up (NO in step 1304), a predetermined buzzer is sounded to give warning to the operator (step 1305).

On the other hand, in step 1304, when the instructed part is picked up (YES in step 1304), the LED which has been turned on is turned off and the following instruction (a new parts picking process (step 903) or an assembling process (step 904)) is executed.

Figure 14:
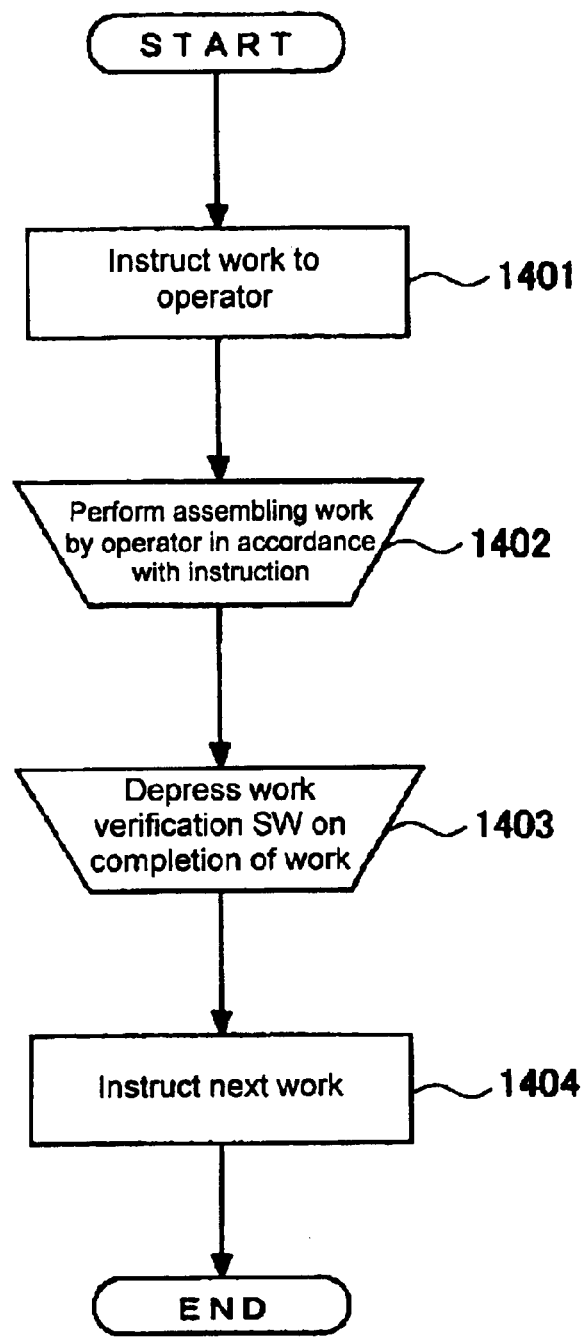
FIG. 14 shows a flowchart showing the details of an assembling work.

The details of the assembling process are shown by the flowchart of FIG. 14. In the assembling process, first, the personal computer 1 instructs an assembling work by sentences, drawings, or the like via the monitor (step 1401). The operator sees the work and performs an assembling work by using the jigs and parts which are already picked up (step 1402). When the assembling work shown in the work details is finished, the operator depresses the work verification switch (step 1404). When the work verification switch is depressed, the personal computer 1 executes the following instruction (new assembling process (step 904) or the parts picking process (step 903)) (step 1404).

Referring again to the flowchart of FIG. 9, the product assembling process constructed by the parts picking process (step 903) and the assembling process (step 904) is repeated until the quantity of products reaches the quantity instructed in step 804 (NO in step 905, and step 903 or 904). When the quantity of products reaches the quantity designated in step 804 (YES in step 905), the end of the work is notified to the operator via the monitor, thereby finishing the series of work supporting processes.

Since the area sensor is employed as a photoelectric sensor in the foregoing embodiment, unlike the conventional work support apparatus, it is unnecessary to prepare a number of sensors in accordance with the number of parts storage boxes and sizes, and the cost of the sensor can be largely reduced. In addition, it is unnecessary to mount photoelectric sensors for the parts storage boxes, so that parts shelves of various parts box layout configurations can be easily and cheaply constructed.

Further, by only pre-storing information of a storage box holding member to be assembled to the sensor holding member (information regarding the parts corresponding to a plurality of parts storage boxes and sizes and positions of the storage boxes) in the information processor, storage box holding members of various parts box layout configurations can be arbitrarily assembled to one sensor holding member. Thus, flexibility can be given to the layout of the parts storage boxes in the parts shelf.

Although the details of changeover in the parts shelf have been described above, changeover can be similarly performed in the jig shelf.

As obviously understood from the above description, in the work support apparatus of the invention, the cost of the photoelectric sensors can be largely reduced. In addition, flexibility can be given to the layout of the parts storage boxes in the box shelf, so that the changeover suitable for production of small volumes of a wide variety of products is realized.

What is claimed is:

1. A work support apparatus comprising:
a parts shelf in which a plurality of parts storage boxes with a parts ejection port facing forward are housed; and
an information processor,
for properly notifying an operator of position of a parts storage box in which a necessary part is stored via a monitor or an indicator disposed for each of the parts storage boxes, and verifying execution of pickup of a part from the notified parts storage box by detecting a hand of the operator reaching a storage box by a photoelectric sensor,
wherein the parts shelf has a configuration in which a storage box holding member for holding a plurality of parts storage boxes and a sensor holding member for holding a photoelectric sensor are provided separately from each other,
the photoelectric sensor is an area sensor capable of detecting the coordinates of a position in which light is shielded in a predetermined two-dimensional region close to the front side of the storage box holding member,
information of parts corresponding to a plurality of parts storage boxes of the storage box holding member and sizes and positions of the storage boxes is pre-stored in the information processor, and
on the basis of the information and the coordinates of the light-shielded position sensed by the area sensor, a storage box including parts, to which a hand of the operator reached is sensed.

2. The work support apparatus according to claim 1, wherein two or more kinds of storage box holding members in which two or more kinds of parts storage boxes of different sizes or shapes are housed in different layouts are prepared.

3. The work support apparatus according to claim 1, wherein information of a plurality of storage box holding members is stored in the information processor.

4. The work support apparatus according to claim 1, wherein the area sensor is fixed in a predetermined position in the sensor holding member and
the storage box holding member is provided with a position varying mechanism for changing a portion in the storage box holding member, which faces an area to be sensed by the area sensor in a state where the storage box holding member is assembled to the sensor holding member.

5. The work support apparatus according to claim 4, wherein a lifter for varying height of a storage box holding member is employed as the position varying mechanism.

6. The work support apparatus according to claim 4, wherein in a work process, the information processor notifies the operator of a timing of changing the position of the storage box holding member via a monitor or an indicator.

7. The work support apparatus according to claim 6, wherein the storage box holding member has a plurality of indicators disposed in correspondence with the storage boxes to selectively instruct a parts box to the operator, and
the information processor notifies the operator of a portion in the storage box holding member to face an area to be sensed by the area sensor by simultaneously turning on predetermined indicators on the timing of changing the position of the storage box holding member.

8. The work support apparatus according to claim 5, wherein a plurality of RFID tags are provided in a line in the height direction for the storage holding member,
the sensor holding member has an RFID tag reader, and
the information processor determines whether the position of the storage box holding member is properly changed or not on the basis of ID tag information read by the ID tag reader.

* * * * *